United States Patent
Menke et al.

(10) Patent No.: US 7,056,441 B1
(45) Date of Patent: Jun. 6, 2006

(54) APPARATUS AND METHOD FOR PROCESSING OF ANIMAL MANURE WASTEWATER

(75) Inventors: Lucas Menke, Munich (DE); George Troubounis, Munich (DE); Brad Leitner, Appleton, WI (US); Bob Knoll, DePere, WI (US); Carl Theunis, Kaukauna, WI (US)

(73) Assignee: Meri Entsorgungstechnik fur die Papierindustrie GmbH, Munich (DE)

( * ) Notice: Subject to any disclaimer, the term of this patent is extended or adjusted under 35 U.S.C. 154(b) by 0 days.

(21) Appl. No.: 11/062,141

(22) Filed: Feb. 18, 2005

(30) Foreign Application Priority Data

Dec. 29, 2004 (EP) .................... 04030982

(51) Int. Cl.
 *C02F 1/24* (2006.01)
 *C02F 9/02* (2006.01)
 *C02F 11/12* (2006.01)

(52) U.S. Cl. ............... 210/703; 210/780; 210/805; 210/806; 210/195; 210/205; 210/221.2; 210/297; 210/346; 210/391; 210/314

(58) Field of Classification Search ............ 210/703, 210/780, 805, 806, 195, 205, 221.2, 297, 210/346, 314, 391
See application file for complete search history.

(56) References Cited

U.S. PATENT DOCUMENTS

| | | | |
|---|---|---|---|
| 3,971,720 A | | 7/1976 | Swanson et al. |
| 3,982,499 A | * | 9/1976 | Frankl .................. 119/450 |
| 4,282,256 A | * | 8/1981 | Evich et al. ............. 426/7 |
| 4,855,065 A | * | 8/1989 | Keeter et al. ......... 210/776 |
| 5,514,282 A | * | 5/1996 | Hibbard et al. ....... 210/652 |

FOREIGN PATENT DOCUMENTS

| | | |
|---|---|---|
| EP | 0 507 416 | 10/1992 |
| EP | 0 990 622 | 4/2000 |
| FR | 2 484 272 | 12/1981 |

\* cited by examiner

*Primary Examiner*—Thomas M. Lithgow
(74) *Attorney, Agent, or Firm*—Jaspan Schlesinger Hoffman LLP; Alexander G. Vodovozov, Esq.

(57) ABSTRACT

According to the present invention, there is provided a wastewater processing apparatus and method comprising a rotating filter thickener (20) receiving and filtering a wastewater mixture and producing a first filtrate output and a first sludge output, a screw press thickener (24) receiving the first sludge output and forming a final sludge output and a second filtrate output, a dissolved air flotator (46) receiving the first filtrate output from the rotating filter thickener (20) and producing a first solid output and a third filtrate output, a first conductor (10, 12, 29) for mixing incoming raw manure wastewater and the second filtrate output from the screw press thickener (24) to produce the wastewater mixture for input to the rotating filter thickener (20), and a second conductor (34) for branching off a part of the first filtrate output to a spray cleaner (38) for spraying the part of the first filtrate output onto the filtration disks (70) for their cleaning.

18 Claims, 4 Drawing Sheets

APPARATUS AND METHOD FOR PROCESSING OF ANIMAL MANURE WASTEWATER

BACKGROUND OF THE INVENTION

1. Technical Field of the Invention

The present invention generally relates to wastewater processing. More particularly, the present invention is directed to a wastewater processing apparatus and a wastewater processing method for the processing of animal manure wastewater.

2. Description of the Prior Art

It is known to process raw animal manure wastewater for mechanical separation and thickening in order to produce, on the one hand, a sludge of high consistency and content of residuals, such as nutrients (e.g., phosphorous and nitrogen compounds), and on the other hand, a liquid (i.e., filtrate) with low content of residuals that can be easily disposed, e.g., by spraying on agricultural fields.

EP 498 337 discloses a state of the art process that uses a centrifuge. This process requires high energy input and produces a comparatively low consistency of sludge (i.e., with still considerable fluid content). Furthermore, due to the high energy input, the residuals tend to disintegrate, resulting in a high degree of resolved nutrients (especially phosphorous and nitrogen) in the filtrate.

A screw press is known for compressing sludge. The screw press requires an inlet consistency of sludge having low water content. Furthermore, the screw press is sensitive to fluctuations in feed conditions and composition of the sludge.

EP 254 841 discloses a device for processing of manure comprising a drum filter unit.

SUMMARY OF THE INVENTION

It is an object of the present invention to provide an apparatus for processing animal manure wastewater to produce a sludge of low liquid content and a liquid filtrate with low content of nutrients (nitrogen and phosphorous).

It is a further object of the present invention to provide an apparatus that requires low energy and little space.

It is yet a further object of the present invention to provide an apparatus that is able to process manure wastewater of a wide range of liquid and nutrient content.

These objects are met by the invention as set out in claims 1 and 16. Further advantageous features of the invention are detailed in the dependent claims.

In the invention, the combination of a rotating filter thickening means with a subsequent screw press thickening means requires little installation room while at the same time enabling a separation of the manure in a sludge fraction of high consistency of at least 35% solids. A part of the filtrate from the rotating filter thickening means is branched off, returned to the rotating filter thickening means, and fed to spray nozzles under pressure that are directed onto the filtration disks of the rotating filter thickening means to provide for their cleaning.

The rotating filter thickening means has in contrast to other prior art filtering devices the advantage of being able to be adjusted to varying feed conditions by selecting the desired liquid level inside and the number of revolutions of the rotating filtration disks. Not only may the amount of incoming manure vary but also its consistency could vary, which would result in filtration results of differing quality in prior art devices, such as rotating drum filters. Contrary to the prior art devices, the rotating filter thickening means can be operated dynamically to deliver stable filtrate quality and high sludge consistency, even under extreme varying feed conditions.

Also the space required for the rotating filter thickening means to obtain a certain output is less than with previous apparatus.

The invention thus ensures a controlled stable quality of the filtrate with controlled particle size of solids. The dewatering is achieved gently, preventing the nutrients present in the manure in a non-dissolved state to remain in this state and to be concentrated in the sludge. This leads to a lower concentration of dissolved nutrients in the filtrate, requiring less effort (e.g., chemicals) for its handling.

The provision of a dissolved air flotation means for the remaining filtrate from the rotating filter thickening means enables the extraction nutrients from the filtrate. On the other hand, the filtrate from the screw press thickening means is returned and mixed with the incoming manure wastewater.

One major feature of the invention is that the filtrate from the screw press thickening means is returned to the input of the rotating filter thickening means, which enables the operating conditions of both devices to be adjusted to optimum. Thus, even with manure wastewater of changing conditions (water content) it is possible to achieve a high and stable quality of the filtrate. At the same time, the shear forces applied to the manure are kept low so that the tendency of nutrients in the sludge to dissolve is reduced, which again results in the dissolved air flotation means being able to be kept smaller and/or the addition of chemical agents necessary to handle such dissolved nutrients can be reduced. In other words, more of the nutrients can be retained in the sludge.

If contrary to the teaching of the invention, the filtrate of the screw press thickening means were to be combined with the filtrate of the pre-thickening stage, this would require a larger flotation device and it would be much more difficult to maintain optimum operating conditions in the two thickening steps.

According to a preferred embodiment of the invention, the coaxial filtration disks of the rotating filter thickening means rotates with 5 to 15 revolutions per minute, controlled depending on its inside wastewater level thus assuring stable operating conditions in the rotating filter thickening means.

According to a further preferred embodiment of the invention, the rotation velocity exerted by the screw press thickening means is controlled by the inside substance level at the screw press thickening means feed chamber. This has the advantage to operate the screw press thickening means with stable torque and thus to be able to achieve the best possible final consistency and throughput under varying and fluctuating feed conditions.

According to yet a further preferred embodiment of the invention, a third filtration means for the filtrate is arranged behind the dissolved air flotation means.

In one preferred embodiment, the third filtration means is preferably a sand filter device. This has the advantage of a polishing function through additional removal of suspended solids but also offers the possibility by adding proper chemicals to remove selective nutrients (e.g., remaining phosphorous).

Alternatively, the third filtration means comprises a rotating conical wire basket onto which the filtrate is sprayed, from the inside which has a mesh size in the range of about 40 μm to about 150 μm, so as to allow particles of less than that size to pass with the filtrate. The feed is separated into a coarse fraction dropping to the bottom of the conical wire basket and a fine fraction passing through the wire mesh.

According to a further preferred embodiment of the invention, the solid output of the third filtration means is returned and added to the input of the dissolved air flotation means.

According to another preferred embodiment of the invention, a separation means is provided which receives the wastewater mixture and separates heavy particles therefrom before the wastewater mixture is fed to the rotating filter thickening means. Most preferably, it comprises tangentially arranged input and output tubing to a basically cylindrical chamber that produces and subjects the contents of the chamber to a spiralling upwardly revolving motion, allowing heavy particles to sink to the bottom of the chamber. This arrangement allows a simple and efficient removal of coarse and large particles, which are thus eliminated from the further processing, avoiding damaging of the subsequent devices or impeding their functions.

According to a further preferred embodiment of the invention, a feed tank is provided with a first input tube for the raw manure wastewater and a second input tube for the second filtrate from the screw press thickening means and an output tube connected to the rotating filter thickening means or the separation means. This feed tank allows to thoroughly mix the components making up the wastewater mixture fed to the rotating filter thickening means. Furthermore, variations in the amount of incoming raw manure wastewater can thus be balanced out.

According to a further preferred embodiment of the invention, a filtrate tank is provided having an input tube for receiving the first filtrate output from the rotating filter thickening means and a first output tube for providing a first portion of the first filtrate to the dissolved air floatation means and a second output tube for providing a second portion of the first filtrate to the at least one spray nozzle device. This filtrate tank allows compensating for variations in the amount of filtrate.

In this embodiment, a fresh water tube is connected to the second output tube for introducing fresh water into the spray nozzle device. Thus, during this starting phase of operation when there is little or no filtrate in the system it is possible to nevertheless rinse and clean the filtration disks. Subsequently, the fresh water feed tube can be closed, as sufficient filtrate will become available.

Preferably, the rotating filter means includes 2 to 20 filtration disks each comprising a rigid structure and an attached wire mesh, further including spray pipes interposed between each two filtration disks comprising spray nozzles directed to the wire mesh. The number of filtration disks will depend on the size of the apparatus and the amount of manure wastewater to be processed.

BRIEF DESCRIPTION OF THE DRAWINGS

The invention will further be described taking reference to the accompanying drawings in which.

DETAILED DESCRIPTION OF THE PREFERRED EMBODIMENTS OF THE INVENTION

In accordance with the present invention as described below, the term animal manure wastewater refers to the manure of any livestock and most preferably to that of cattle.

Figure 1:
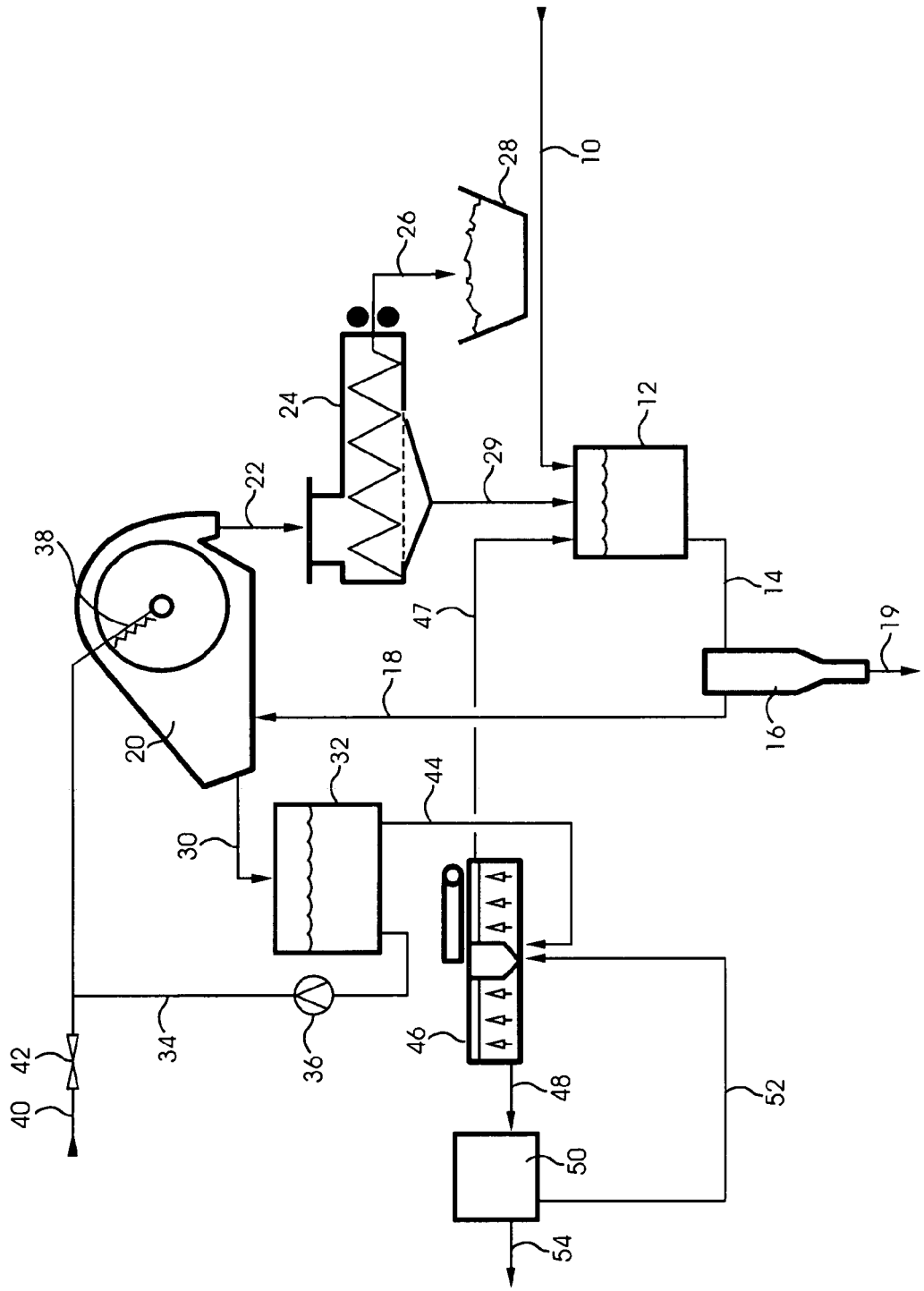
FIG. 1 is a schematic process diagram of the wastewater processing apparatus according of present invention.

In accordance with the process of FIG. 1, animal manure wastewater, such as from cattle, is introduced through manure feed tube 10 into a feed tank 12. It should be understood that one or more pumping devices may be provided, as considered necessary by the skilled person, which are not shown in the schematic diagram for reasons of clarity and brevity. The feed tank 12 is connected to a feed tank output tube 14, which in turn connects to a heavy particle separator 16. The heavy particle separator is described in more detail with reference to FIG. 2. Connecting tube 18 connects the heavy particle separator 16 to a rotating filter 20, which is described in more detail with reference to FIG. 3. Heavy particle separator 16 further includes a heavy particle outlet 19.

A sludge output 22 of the rotating filter 20 connects to the input of a screw thickener 24 described in more detail with reference to FIG. 4.

The screw thickener 24 comprises a sludge outlet 26 connected to a sludge hold 28, which receives sludge having a consistency of about 35% to about 55% solids. The screw thickener 24 further comprises a filtrate outlet tube 29 connected to the feed tank 12.

The rotating filter 20 comprises a filtrate outlet tube 30 connected to a filtrate tank 32. The filtrate tank 32 is connected to two output tubes, namely, a feedback tube 34 comprising a pressure device 36. The feedback tube 34 connects to a spray nozzle device 38 (not described in further detail), which comprises tubing and a plurality of spray nozzles directed at the filtration disks of rotating filter 20 for their rinsing and cleaning.

A fresh water inlet 40 comprising a shut-off valve 42 is further connected to the feedback tube 34 for introducing fresh water during a start-up phase of operation.

The filtrate tank 32 has a second outlet tube 44 connected to a dissolved air floatator 46, which is known in the art. A solids output 47 of the dissolved air floatator 46 collects the solids and particles that are on the water surface and feeds them back into the feed tank 12.

A flotator outlet 48 connects the dissolved air floatator 46 to a filter 50. Filter 50 is preferably a sand filter produced by the applicant and sold under the brand name "Gyro Sand," or a fractionating filter produced by the applicant and sold under the brand name "Conus Trenner". The filter 50 preferably has a mesh size from about 40 μm to about 150 μm. In any case, filter 50 includes tube 52, for returning the flotate (solid matter) to the input of the dissolved air floatator 46, and tube 54 for outputting the final filtrate of the wastewater processing apparatus according to the invention.

Figure 2:
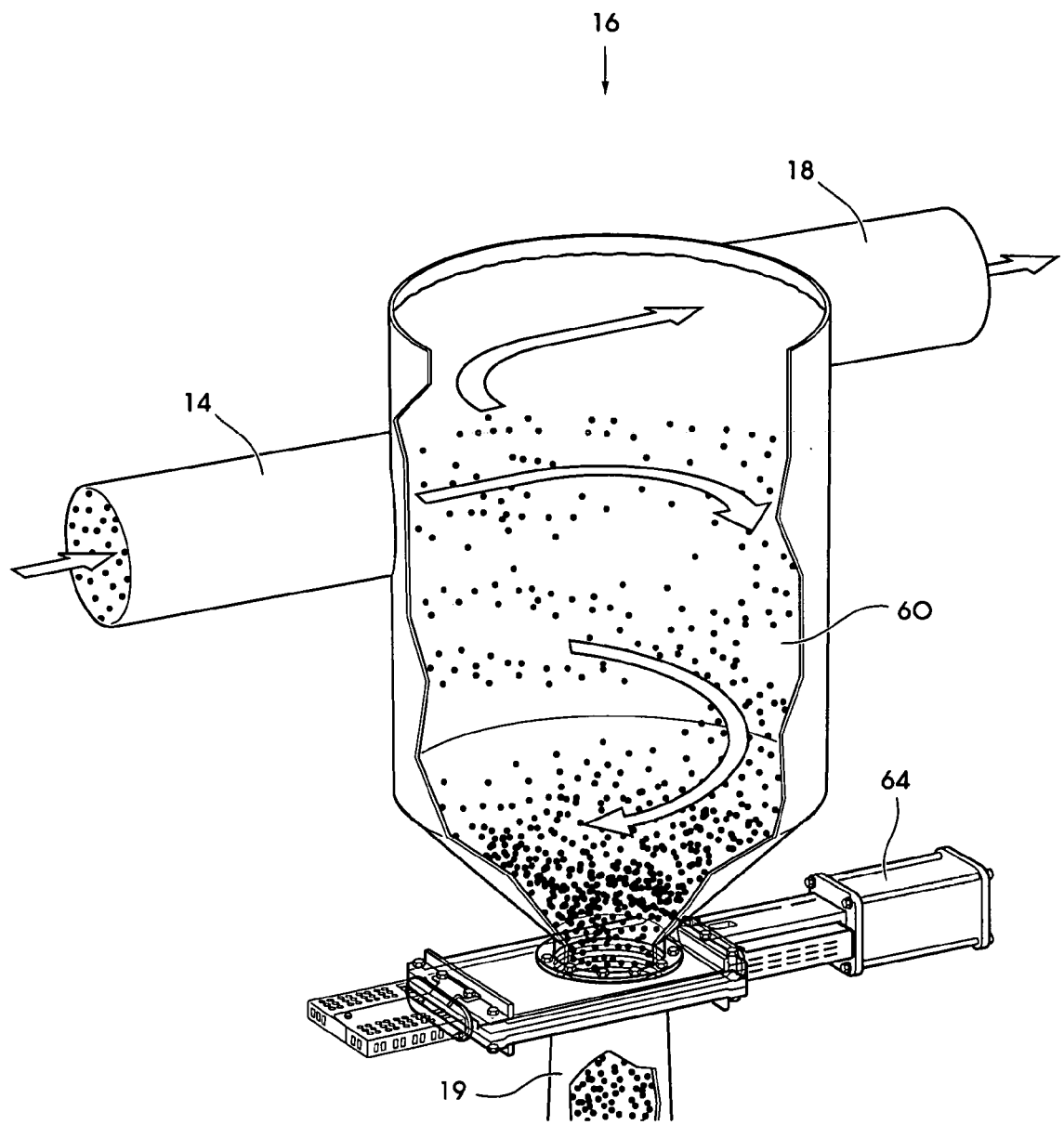
FIG. 2 is a perspective exploded view of a heavy particle separator of FIG. 1.

In accordance with FIG. 2, the heavy particle separator 16 is connected to feed tank output tube 14 and connecting tube 18, which is arranged vertically above feed tank output tube 14. Both tubes 14 and 18 are arranged tangentially with respect to the basically cylindrical separating chamber 60. The bottom of separating chamber 60 leads into the heavy particle outlet 19 comprising a shut-off valve device 64. In operation, the liquid incoming through tangentially arranged feed tank output tube 14 is subjected to a spirally upwardly revolving motion moving to connecting tube 18, enabling separation of heavy particles such as pieces of metal or rocks which move downwardly in the cylindrical separating chamber 60 towards and into the heavy particle outlet 19.

Figure 3:
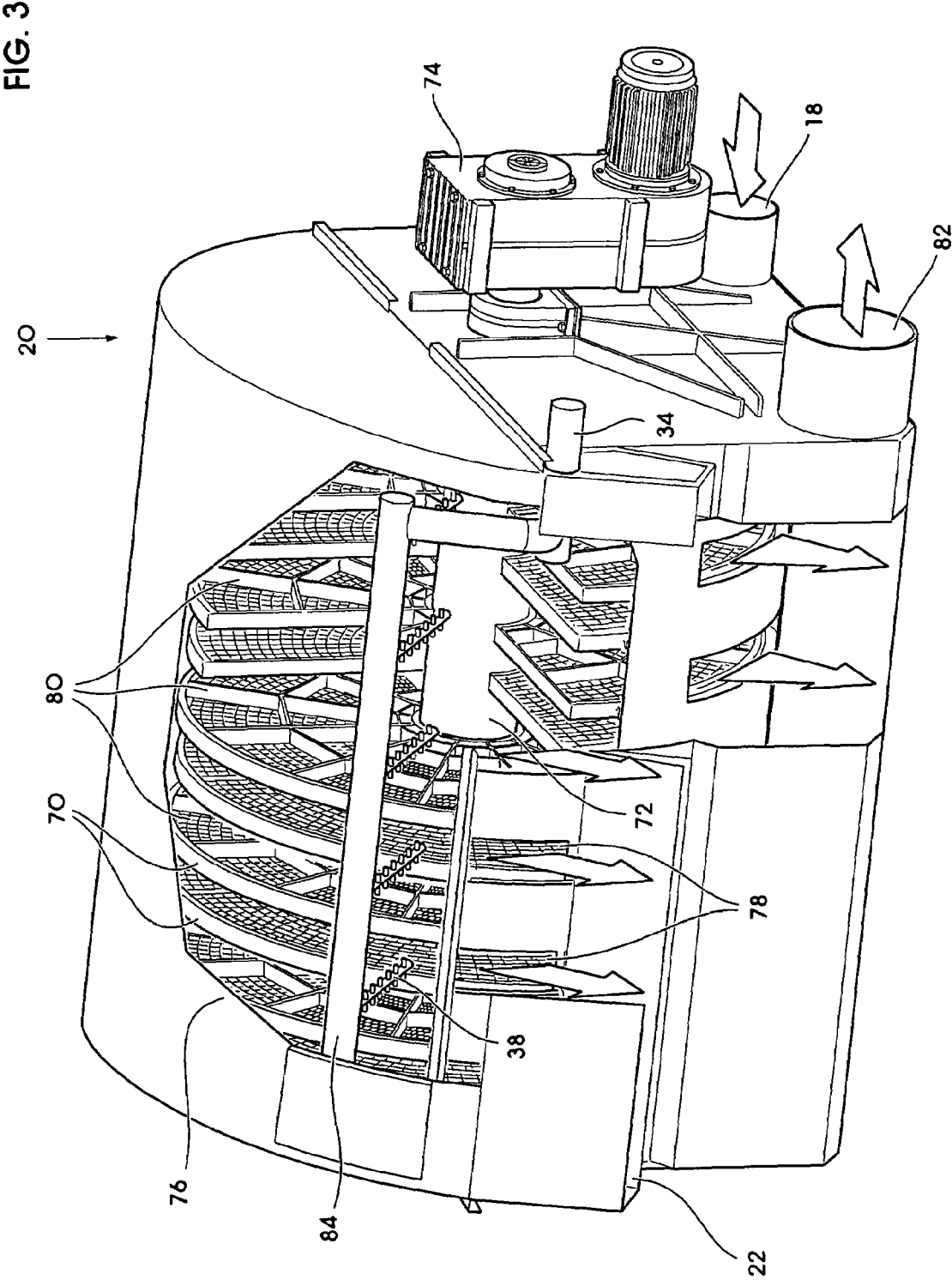
FIG. 3 is a perspective exploded view of a rotating filter of FIG. 1.

In accordance with FIG. 3, the rotating filter 20 comprises a plurality of filtration disks 70 attached to a common shaft 72 and rotated by motor 74. The rotating filter 20 preferably includes between 2 and 20 filtration disks 70. The motor 74 preferably rotates the common shaft 72 from about 5 to about 15 revolutions per minute depending on the wastewater level inside the rotating filter 20, which is determined via a liquid level sensor (not shown). More specifically, if the sensed liquid level becomes higher than a first predetermined level, the rotational speed is increased; if the sensed liquid level becomes lower than a second predetermined level, than the rotational speed is decreased. Both the increase and the decrease in rotational speed is preferably within the range specified above. The outer rims of the filtration disks 70 are sealed watertight against the apparatus housing 76. Between adjacent filtration disks 70 there are formed alternating axial spaces 78 and 80. Axial spaces 78 communicate with each other and the connecting tube 18 so that the incoming sludge is separated by the filtration disks 70. Axial spaces 80 communicate with each other and also filtrate outlet 82.

Each of the filtration disks 70 preferably comprises a circular frame with radial struts and wire mesh of predetermined mesh size. The mesh size is preferably from about 250 µm to about 500 µm so as to restrict the size of particles that may pass the filtration disks 70 towards and into the filtrate outlet 82.

Those particles larger in size than the mesh size are concentrated and moved towards the sludge output 22. In operation, the sludge incoming through connecting tube 18 is passed to each axial space 78 and subjected to revolving motion through the filtration disks 70. During this motion, a large fraction of the water in the sludge and small particles pass through the wire mesh of the filtration disks 70 and exit the rotating filter 20 through filtrate outlet 82. On the other hand, the sludge is dewatered by this action and exits the rotating filter 20 through the sludge output 22.

The rotating filter 20 further includes tubing 84 and a spray nozzle device 38 including a number of spray nozzles directed at the filtration disks 70 for spraying water onto the wire mesh of the filtration disks 70, to ensure their cleaning and prevent blocking.

Figure 4:
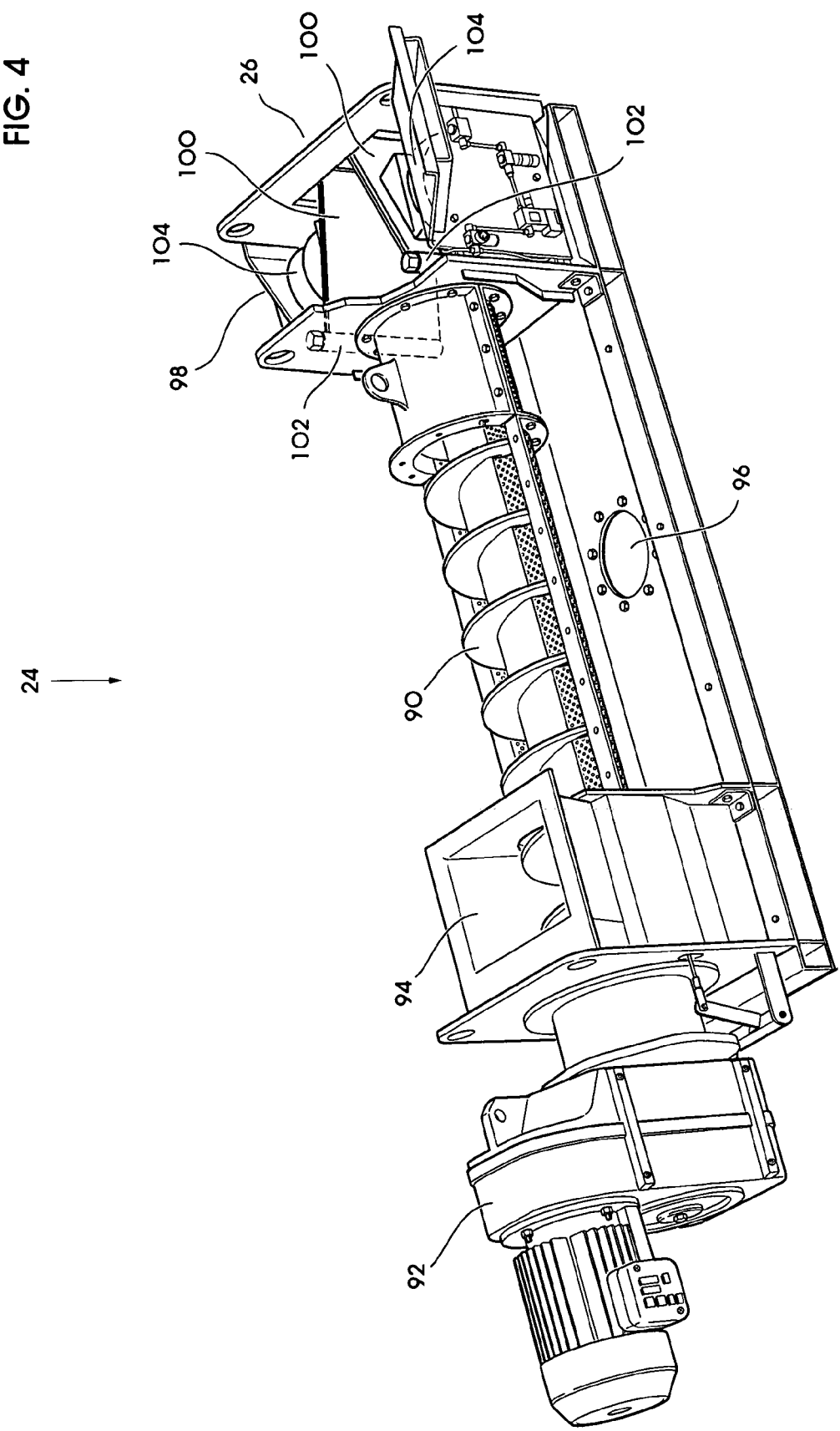
FIG. 4 is a perspective view of a screw thickener of FIG. 1.

In accordance with FIG. 4, the screw thickener 24 comprises a thickening screw 90 driven by a motor 92, a feed input 94 that communicates with the sludge output 22 of the rotating filter 20 shown and described in FIG. 3. A filtrate outlet 96 connects to the filtrate outlet tube 29 shown in FIG. 1.

A tapered section 98 is provided behind the forward axial end of thickening screw 90. The tapered section 98 is preferably provided with an adjustable cross section so as to control the pressure exerted to the compressed sludge before leaving the screw thickener 24 at sludge outlet 26. The adjustable cross section is preferably formed of two plates 100, rotatably attached to vertically arranged swivel axes 102 at the forward axial end of the thickening screw 90 and rotationally adjustable by pressure actuators 104 to provide the adjustable cross section. If due to the amount of incoming sludge from the rotating filter 20, the liquid level (sensed by a not shown sensor) within the screw thickener 24 drops, then the plates 100 are actuated towards one another by the pressure actuators 104 so as to reduce the cross section in the tapered section 98 which leads to a build-up of pressure.

The overall operation of the preferred embodiment of the wastewater processing apparatus according to the present invention will be described below with reference to FIGS. 1–4.

Raw animal manure wastewater having a consistency of about 1% to about 4% solids is introduced to the apparatus through manure feed tube 10 and fed into a feed tank 12. Feed tank 12 serves, on the one hand, to buffer variations of inflow amounts, and, on the other hand, to mix the manure wastewater with the filtrate coming from the filtrate output 96 of the screw thickener 24 and the sludge coming from the solids output 47 of the dissolved air floatator 46. This mixture is then pumped (by fluid pumps not shown) to the heavy particle separator 16, the function of which has been described with respect to FIG. 2 above. Heavy particles such as metal or stone pieces are separated from the mixture and removed through heavy particle outlet 19.

The remaining manure mixture is afterwards transferred through connecting tube 18 to the input of the rotating filter 20. As has been described with respect to FIG. 3 above, the manure mixture is moved into each axial space 78 and drawn in a circular movement by the rotating filtration disks 70, during which a considerable part of the water component from the manure mixture passes the wire mesh of the filtration disks 70 and exits the rotating filter 20 through filtrate outlet 82 connected to filtrate outlet tube 30. The partially dewatered manure sludge exiting through sludge output 22 has an increased solids consistency of at least 5%, and preferably from about 6% to about 12%, solids. From there, the partially dewatered manure sludge is introduced to the screw thickener 24 through its feed input 94.

Preferably, the screw thickener 24 is arranged below the rotating filter 20 so that the partially dewatered manure sludge can simply fall from sludge output 22 down through feed input 94.

The partially dewatered manure sludge is then compressed in the screw thickener 24 due to the forward motion induced by the rotating thickening screw 90 and the resistance produced axially behind its far end by the tapered section 98. The screw thickener 24 increases the consistency of the manure sludge from about 35% to about 55% solids.

The water content of the manure sludge thus separated is collected in filtrate outlet 96 and fed back into the feed tank 12 through filtrate outlet tube 29.

Returning back to the rotating filter 20, the path of the filtrate water (first filtrate) separated from the wastewater mixture by passing through the filtration disks 70 and the axial spaces 80 will be described. This first filtrate is collected and exits the rotating filter 20 through filtrate outlet 82 to be passed through filtrate outlet tube 30 into filtrate tank 32. A fraction of the filtrate collected there is fed via feedback tube 34, pressure device 36 and tubing 84 to the spray nozzle device 38 in rotating filter 20. This filtrate is sprayed under pressure from the output side of axial spaces 80 onto the wire mesh so as to prevent clogging.

During a start-up phase of operation of the wastewater processing apparatus according to the invention there will be no or little filtrate water in the wastewater processing apparatus, and thus, in the filtrate tank 32. In order to also prevent a clogging in this initial operation phase the system includes the fresh water inlet 40 which is connected to the wastewater processing apparatus by opening shut-off valve 42, thus introducing fresh water into tubing 84 and the spray nozzle device 38 until the operation of the rotating filter 20 has produced sufficient filtrate water in the filtrate tank 32. Then shut-off valve 42 is closed and only the filtrate water is re-circulated and fed to the spray nozzle device 38.

The remaining part of the filtrate in filtrate tank 32, which is not fed back through feedback tube 34, flows through outlet tube 44 to the dissolved air floatator 46. The dissolved air floatator 46 is of a conventional structure and will not be described in great detail. Essentially, via micro bubbles of air, the dissolved air floatator 46 separates and removes certain suspended particles present in the filtrate, while the cleaned water is drawn off near the bottom of the dissolved air floatator 46 at the flotator outlet 48, and fed to the additional filter 50 that has been described above. The filtrate output of filter 50 is the filtrate water, which in comparison to the raw manure feed (100%), in terms of concentration, comprises less than 10% suspended solids, less than 50% total nitrogen and less than 30% of total phosphorous.

The solid matter separated by filter 50 is fed via tube 52 to the input of the dissolved air floatator 46.

The above description is made with respect to the preferred embodiment of the present invention and for those skilled in the art it is possible to make a variety of modifications and changes to the above-described specific embodiment without departing from the scope and spirit of the present invention. All these modifications and changes should be considered within the scope of the present invention as defined in the appended claims.

What is claimed is:

1. A wastewater processing apparatus comprising:
    a rotating filter thickening means (20) comprising a number of rotating coaxial filtration disks (70) for receiving and filtering a wastewater mixture and producing a first filtrate output and a first sludge output;
    a screw press thickening means (24) comprising a rotating screw (90) for receiving the first sludge output and forming a final sludge output and a second filtrate output;
    a dissolved air floatation means (46) for receiving the first filtrate output from the rotating filter thickening means (20) and producing a first solid output and a third filtrate output;
    a first conducting means (10, 12, 29) for mixing incoming raw manure wastewater and the second filtrate output from the screw press thickening means (24) to produce the wastewater mixture for input to the rotating filter thickening means (20); and
    second conducting means (34) for branching off part of said second filtrate output to a spray cleaning means (38) for spraying said branched part of said first filtrate output onto said filtration disks (70) for their cleaning.

2. The apparatus of claim 1, comprising a conduct (47) for feeding the first solid output from said dissolved air floatation means (46) to said first conducting means (10, 12, 29) for mixing said first solid output with said wastewater mixture.

3. The apparatus of claim 1, wherein said coaxial filtration disks (78) of said rotating filter thickening means (20) rotate from about 5 to about 15 revolutions per minute, controlled depending on wastewater level inside said rotating filter thickening means (20).

4. The apparatus of claim 1, wherein said screw thickening means (24) includes swivelling plates (100) actuated by plate actuating means (104) for establishing an adjustable cross section to control the pressure exerted by the screw press thickening means (24) on the first sludge output which is controlled depending on inside substance level at the screw press thickening means (24).

5. The apparatus of claim 1, further comprising a third filtration means (50) that receives and filters the third filtrate output from the dissolved air flotation means (46) to produce a second solid output and a final filtrate output.

6. The apparatus of claim 5, wherein said third filtration means (50) is a sand filter.

7. The apparatus of claim 5, wherein said third filtration means (50) comprises a rotating conical wire basket onto which the incoming third filtrate output is sprayed.

8. The apparatus of claim 5, comprising a conduct (52) for feeding said second solid output of said third filtration means (50) to the input of the dissolved air floatation means (46).

9. The apparatus of claim 1, comprising a separation means (16) that receives the wastewater mixture and separates heavy particles therefrom before the wastewater mixture is fed to the rotating filter thickening means (20).

10. The apparatus of claim 9, wherein said separation means (16) comprises tangentially arranged input (14) and output (18) tubing to a basically cylindrical chamber (60) producing a spirally upwardly revolving motion to the wastewater mixture allowing heavy particles to sink to the bottom of said chamber (60).

11. The apparatus of claim 9, comprising a feed tank (12) with a first input tube (10) for the incoming raw manure wastewater and a second input tube (29) for the second filtrate output from said screw press thickening means (24) and an output tube (14, 18) connected to said rotating filter thickening means (20) or said separation means (16).

12. The apparatus of claim 1, comprising a filtrate tank (32) having an input tube (30) for receiving the first filtrate output from said rotating filter thickening means (20) and a first output tube (44) for providing a first portion of the first filtrate output to said dissolved air floatation means (46) and a second output tube (34) for providing a second portion of the first filtrate output to at least one spray nozzle device of the spray cleaning means (38).

13. The apparatus of claim 12, further comprising a fresh water tube (40) connected to the second output tube (34) for introducing fresh water to the at least one spray nozzle device of the spray cleaning means (38).

14. The apparatus of claim 1, wherein said rotating filter thickening means (20) includes 2 to 20 disks (70) each comprising a rigid structure and including a wire mesh of a predetermined mesh size.

15. The apparatus of claim 14, wherein said rotating filter thickening means (20) further includes a spray pipe (84) connected to said at least one spray nozzle device of the spray cleaning means (38), the at least one spray nozzle device directed to the wire mesh for cleaning/rinsing.

16. A method for processing animal manure wastewater into a filtrate and sludge comprising:
    subjecting a wastewater mixture to a rotating filter thickening means (20) comprising a number of rotating coaxial filtration disks (70), wherein part of the liquid of said wastewater mixture passes through said filtration disks (70) forming a first filtrate output and a first sludge output;
    compressing said first sludge output in a screw press thickening means (24) comprising a rotating screw to form a second filtrate output and a final sludge output;
    subjecting said first filtrate output to a dissolved air flotation process producing a first solid output and a third filtrate output;
    mixing said second filtrate output with a raw manure wastewater to produce said wastewater mixture; and
    branching off and spraying a part of said first filtrate output onto said filtration disks for their cleaning.

17. The method of claim 16, further comprising filtering the third filtrate output to produce a final filtrate output.

18. The method of claim 16, further comprising collecting the first solid output of said dissolved air flotation process, and mixing the collected first solid output with said wastewater mixture.

* * * * *

UNITED STATES PATENT AND TRADEMARK OFFICE
CERTIFICATE OF CORRECTION

PATENT NO. : 7,056,441 B1  Page 1 of 1
APPLICATION NO. : 11/062141
DATED : June 6, 2006
INVENTOR(S) : Lucas Menke et al.

It is certified that error appears in the above-identified patent and that said Letters Patent is hereby corrected as shown below:

Column 2, line 17, the words reading "the extraction nutrients from the filtrate" should read as --the extraction of nutrients from the filtrate--.
In Claim 1, found in Column 7, line 39, the words reading "second filtrate" should read as --first filtrate--.

Signed and Sealed this

Fourth Day of March, 2008

JON W. DUDAS
*Director of the United States Patent and Trademark Office*